(12) United States Patent
Hiruma

(10) Patent No.: US 7,012,713 B1
(45) Date of Patent: Mar. 14, 2006

(54) IMAGE PROCESSING APPARATUS AND IMAGE PROCESSING METHOD

(75) Inventor: Takashi Hiruma, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1115 days.

(21) Appl. No.: 09/639,278

(22) Filed: Aug. 15, 2000

(30) Foreign Application Priority Data

Aug. 17, 1999 (JP) ................................ 11-230575
May 29, 2000 (JP) ............................. 2000-158320

(51) Int. Cl.
*G06F 15/00* (2006.01)

(52) U.S. Cl. ........................ 358/1.9; 358/500; 358/504; 358/530; 358/3.22; 358/3.23

(58) Field of Classification Search ................ 358/1.9, 358/500, 504, 530, 3.22, 3.23; 382/162
See application file for complete search history.

(56) References Cited

U.S. PATENT DOCUMENTS

| | | | | |
|---|---|---|---|---|
| 5,400,153 A | * | 3/1995 | Schonenberg et al. ....... | 358/516 |
| 5,712,924 A | * | 1/1998 | Fujimoto et al. ............ | 382/165 |
| 5,761,345 A | * | 6/1998 | Saito et al. ................. | 382/246 |
| 5,786,906 A | * | 7/1998 | Shishizuka .................. | 358/500 |
| 6,256,112 B1 | * | 7/2001 | Kawano ..................... | 358/1.9 |
| 6,266,152 B1 | * | 7/2001 | Nakajima ................... | 358/1.9 |
| 6,466,693 B1 | * | 10/2002 | Otsu et al. .................. | 382/176 |
| 6,501,563 B1 | * | 12/2002 | Sato et al. .................. | 358/1.9 |
| 6,594,039 B1 | * | 7/2003 | Kanbayashi ................ | 358/491 |

FOREIGN PATENT DOCUMENTS

| | | |
|---|---|---|
| JP | 3-58176 | 3/1991 |
| JP | 9-277606 | 10/1997 |

* cited by examiner

*Primary Examiner*—Kimberly Williams
*Assistant Examiner*—Michael Burleson
(74) *Attorney, Agent, or Firm*—Morgan Lewis & Bockius LLP

(57) ABSTRACT

A monochrome/color judgement is executed in an image processing apparatus such as a printer based upon man's visual characteristics with respect to each target pixel in an image. A reference value K is calculated based upon plural color component values in the target pixel, and then, a dispersed value a is obtained based upon the plural color component values. It is judged whether or not a color attribute of the target pixel satisfies a judging condition based upon K and α. If the judging condition is satisfied, the target pixel is judged to be a monochrome pixel, while, if the judging condition is not satisfied, the target pixel is judged to be a color pixel. When any one of pixels among a predetermined unit is a color pixel, color processing is executed, while monochrome processing is executed when all pixels constructing the predetermined unit are monochrome pixels. The judgement can be performed by referring to peripheral pixels. The judging object may be one portion of the image.

23 Claims, 11 Drawing Sheets

IMAGE PROCESSING APPARATUS AND IMAGE PROCESSING METHOD

BACKGROUND OF THE INVENTION

1. Field of the Invention

The present invention relates to an image processing apparatus, and more particularly to a judgement of a monochrome image and color image.

2. Description of the Prior Arts

Among printing systems such as printers are ones in which a process for a printing operation is automatically changed depending upon a fact that the inputted image is a monochrome image (gray image) or a color image. Specifically, the image is processed by monochrome processing in the case of the monochrome image, while the image is processed by color processing in the case of the color image. When a color image area is partially included in the monochrome image, this image is generally processed by a color image.

Japanese Published Unexamined Patent Application No. HEI 9-277606 discloses a conventional monochrome/color judging method. In this conventional method, it is judged to be a monochrome pixel if each of the color component values R, G and B (or C, M, Y and K) possessed by each pixel matches one another.

However, there is a case in the actual image data that each color component value possessed by a pixel does not match one another such as R=100, G=100 and B=101 due to a calculation error. Such a pixel is not visually recognized as a color pixel. If such a pixel is present, for example, as one pixel in one page or as one pixel in one job in the conventional method, the entire image is processed by color processing, thereby entailing a problem of ineffectiveness.

Japanese Published Unexamined Patent Application No. HEI 3-58176 discloses an automatic discriminating method of a monochrome/color document. In this method, a target pixel is judged to be a monochrome pixel or not from a balance of an original color signal (relative difference of a color component value), and then, the document is finally judged to be a color document or monochrome document by a number (ratio) of the monochrome pixels in the document. However, it is considered in this conventional method that the judging criterion of the monochrome pixel and color pixel is fixedly set, and further, man's visual characteristic is not considered. This disclosure discloses that the target pixel is compared with plural peripheral pixels for judging a uniformity of a density distribution.

SUMMARY OF THE INVENTION

The present invention has been made in view of the above circumstances and provides an image processing apparatus that can implement a reasonable monochrome/color judgement.

Further, the present invention provides an image processing apparatus that can perform a monochrome/color judgement with man's visual characteristic considered.

Specifically, the image processing apparatus of the present invention is characterized by including a reference value determining part that determines a reference value with respect to a target element in an image based upon a color attribute of the target element, a judging condition setting part that sets a judging condition based upon the reference value and a monochrome/color judging part that judges that the target element is monochrome if the color attribute of the target element meets the judging condition and that the target element is colored if the color attribute of the target element does not meet the judging condition.

According to this construction, a reference value is firstly determined for every target element in an image based upon a color attribute possessed by the target element, and then, a judging condition is suitably set based upon the reference value. Thereafter, the target element is judged to be monochrome or color according to whether or not the color attribute possessed by the target element meets the judging condition. According to the present invention, the judging condition can dynamically be set according to the color attribute itself possessed by the target element, to thereby be capable of performing a reasonable monochrome/color judgement. The color attribute corresponds here to, for example, color component values of R, G and B or C, M, Y and K.

Although the target element is basically a pixel in the abovementioned construction, a pixel group can be the target element. Further, the definition of the target pixel may optionally be changed by a user. Additionally, the monochrome/color judgement may be performed with respect to a portion of an image, not to an entire image.

The aforesaid image processing apparatus desirably includes a selecting part that selects monochrome image processing or color image processing for every predetermined unit according to the judging result of the monochrome/color judging part. The predetermined unit corresponds here to a job unit or page unit. The concept of the page includes both of a physical page and a logical page.

The selecting part desirably selects the monochrome image processing when all the target elements included in the predetermined unit are judged to be monochrome while it selects the color image processing when any one of the target elements included in the predetermined unit is judged to be colored.

According to this construction, if each target element in the predetermined unit is examined in turn, the color image processing is selected for the predetermined unit upon judging that any one of the target elements is judged to be colored. Therefore, the examination with respect to each target element after the color judgement is performed can be omitted.

Desirably, all pixels or some of pixels in the image are rendered to be the target elements, or desirably, all or some of pixel groups in the image are rendered to be the target elements.

For example, the judging precision can be enhanced if all pixels or all pixel groups constructing the image become judging objects, while processing time can be reduced if some of pixels or pixel groups constructing the image become judging objects. These pixels correspond, for example, to plural representative pixels selected among all pixels constructing the image. Specifically, they are, for example, pixels present on an odd or even line. The pixel groups correspond, for example, to a line or partial area of the image. When the reference value is determined or the judging condition is set with such a pixel group unit, simple processing can be expected.

Further, the image processing apparatus is also characterized by including a reference value determining part that determines a reference value with respect to a target element in an image based upon plural color component values possessed by the target element, a judging range setting part that sets a judging range based upon the reference value, and a monochrome/color judging part that judges that the target element is monochrome if the plural color component values possessed by the target element are present respectively within the judging range and that the target element is colored if any one of the plural color component values possessed by the target element is outside the judging range.

According to this construction, the reference value is determined based upon the plural color component values possessed by the target element, and then, the judging range is set according to the reference value. When all color component values are included within the judging range, the target element is judged to be monochrome. Therefore, according to the present invention, the target element can be treated as a monochrome element if the difference of each color component value from the reference value is within a constant range even though each color component value does not match one another.

The reference value is desirably an average value of the plural color component values possessed by the target pixel. Further, the reference value is desirably a weighed average value of the plural color component values possessed by the target pixel. The judgement can be performed by utilizing the weighed average with man's visual characteristic taken into full consideration.

Desirably, the width of the judging range is variably set in response to the size of the reference value. Specifically, the greater the reference value is, the smaller the width of the judging range is set, while the smaller the reference value is, the greater the width of the judging range is set. This is as a result of taking man's visual characteristic into consideration. Specifically, the monochrome judgement can take priority as long as the color pixel can be neglected or a sense of incongruity does not occur in view of an image recognition.

Desirably, the judging range is individually set for every each color component, and the monochrome/color judgement is executed for every color component. By this construction, the judgement is minutely performed, thereby realizing a more natural judgement.

The image processing apparatus desirably includes a part that is for a user to variably set at least one of the determining condition of the reference value and the setting condition of the judging range. This construction makes it possible to set the judging condition in response to a favor of the user or various conditions.

Further, the image processing apparatus of the present invention is also characterized by including a first judging part that judges whether a target element in an image is monochrome or not, a second judging part that judges whether plural neighboring elements in the vicinity of the target element are monochrome or not when the judgement by the first judging part is not monochrome and a third judging part that judges that the target element is monochrome or color from a comparison of a brightness of the target element with a brightness of the plural neighboring elements when all the neighboring elements are judged to be monochrome by the second judging part, wherein the target element is finally judged to be monochrome if the judgement by the first judging part is monochrome and the judgement by the third judging part is monochrome, while the target element is finally judged to be colored if the second judging part cannot judge that all the neighboring elements are monochrome and the judgement by the third judging part is colored.

According to the abovementioned construction, the neighboring elements can be considered upon performing the monochrome/color judgement of the target element, thereby being capable of implementing a more natural monochrome/color judgement. If a red pixel (corresponding to the target element) is present against a black background (corresponding to the plural neighboring pixels) and the pixel is unremarkable, for example, its pixel can finally be judged to be monochrome by the third judging part even though the first judging part judges that it is colored. Further, if a yellow pixel (corresponding to the target element) is present against a white background (corresponding to the plural neighboring pixels) and its pixel is unremarkable, its pixel can finally be judged to be monochrome by the third judging part even though the first judging part judges that it is colored. In this way, the target element can be totally judged to be monochrome or color by considering the target element itself and its peripheral circumstances.

Desirably, the first judging part includes a first reference value determining part that determines a first reference value based upon a color attribute of the target element, a first judging condition setting part that sets a first judging condition based upon the first reference value and a first monochrome/color judging part that judges that the target element is monochrome when the color attribute of the target element meets the first judging condition while it judges that the target element is colored when the color attribute of the target element does not meet the first judging condition, and the second judging part includes a second reference value determining part that determines a second reference value based upon a color attribute of the neighboring elements, a second judging condition setting part that sets a second judging condition based upon the second reference value and a second monochrome/color judging part that judges that the target element is monochrome when the color attribute of the target element meets the second judging condition while it judges that the target element is colored when the color attribute of the target element does not meet the second judging condition.

Further, the image processing apparatus of the present invention is also characterized by including a monochrome/color judging part that judges whether image data is color data or monochrome data based upon a predetermined judging criterion and a judging criterion variably setting part that variably sets the predetermined judging criterion in the monochrome/color judging part.

According to this construction, the judging criterion can variably be set to thereby be capable of suitably performing the judgement in response to various conditions. In this case, the predetermined judging criterion is suitably and automatically set based upon the image data itself, or a user may select the judging criterion.

The image processing method according to the present invention is characterized by including a process for determining a reference value with respect to a target element in an image based upon a color attribute of the target element, a process for setting a judging condition based upon the reference value and a process for judging whether the target element is monochrome or color from the color attribute of the target element based upon the judging condition.

The recording medium according to the present invention is to store an image processing program executed on a computer, characterized by including a function that determines a reference value with respect to a target element in an image based upon a color attribute of the target element, a function that sets a judging condition based upon the reference value and a function that judges that the target element is monochrome if the color attribute of the target element meets the judging condition and that the target element is colored if the color attribute of the target element does not meet the judging condition.

The concept of this medium includes a transportable recording medium (CD-ROM or the like) and further includes a medium such as hard disc and ROM. Moreover, the concept of the computer includes a printer having an image processing function, a composite machine, a server machine or the like.

The abovementioned monochrome/color judgement of the target element can be executed in various image processing apparatuses. For example, this function may be installed in a printer. Further, this function may be installed in a printer driver. When an image compensation is performed in such an image processing apparatus, the monochrome/color judgement may be performed to an image that has not been subject to the image compensation or to an image that has already been subject to the image compensation. As for the former case, a judgement faithful to the original image can be executed, while in the latter case, a judgement can be executed to an image that is actually outputted. Moreover, the result of the monochrome/color judgement is displayed on a screen for leading a user to select a process. Further, it is desirable that the user can variably set the judging condition (strictness of the judgement or the like) as described above. Additionally, the user may select a desired method among plural judging methods. Moreover, it is possible for the user to designate number conditions (upper limit of a page or the like) for processing as a monochrome image or color image.

BRIEF DESCRIPTION OF THE DRAWINGS

A preferred embodiment of the present invention will be described in detail based on the followings, wherein.

DESCRIPTION OF THE PREFERRED EMBODIMENT

A preferred embodiment of the present invention will be explained hereinbelow with reference to the drawings.

Figure 1:
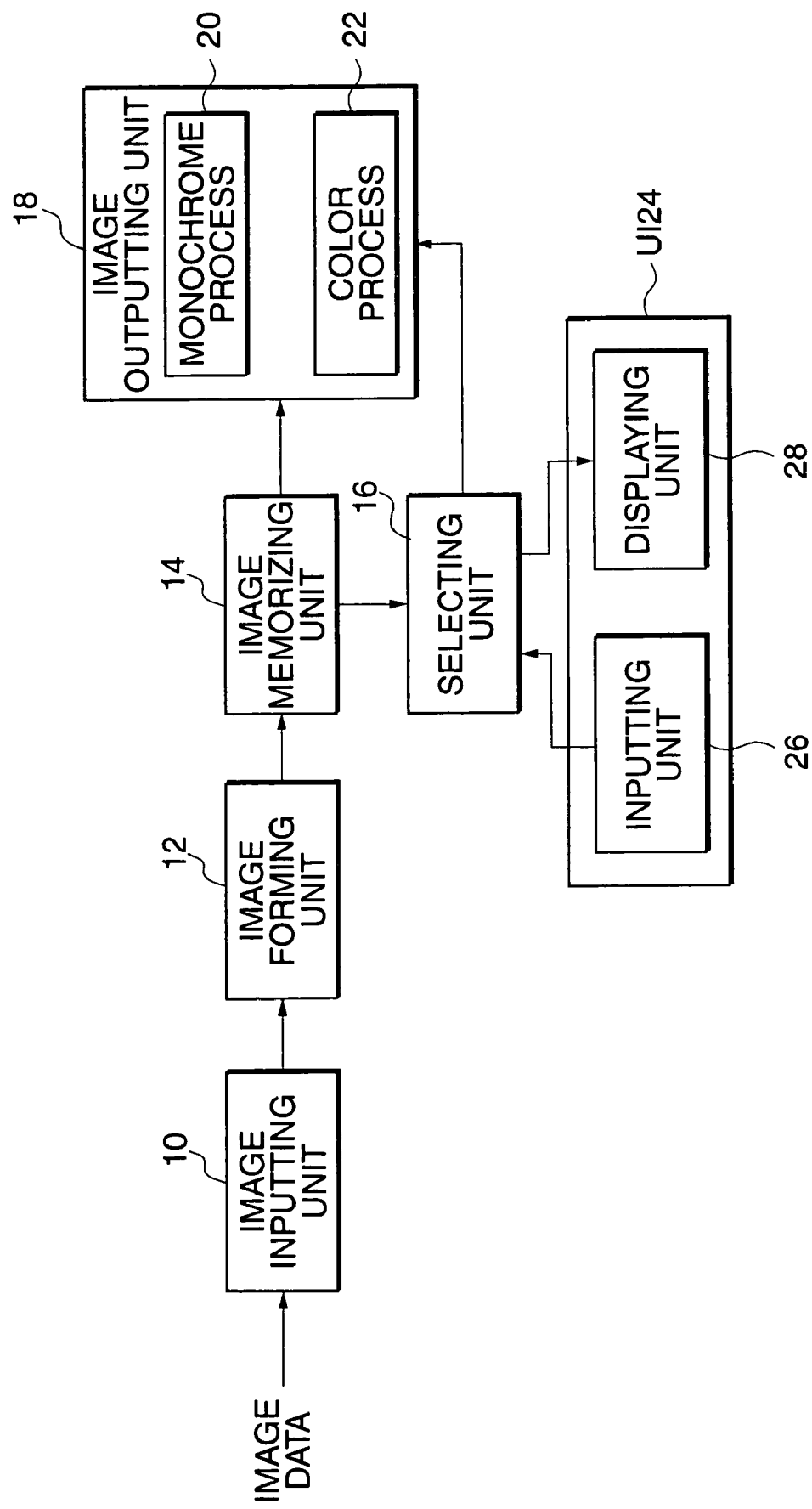
FIG. 1 is a block diagram showing an entire construction of an image processing apparatus according to an embodiment of the present invention.

FIG. 1 shows a preferred embodiment of the image processing apparatus according to the present invention. Specifically, FIG. 1 is a block diagram showing an entire construction of the apparatus.

The image processing apparatus shown in FIG. 1 is a printer in this embodiment. It is to be noted that judging processing of a monochrome color to be described later may be installed at a printer driver and that the present invention is adaptable to another image processing apparatus.

Image data is inputted to an image inputting unit 10 via a network. This image data is, for example, PDL data. An image forming unit 12 interprets this PDL data to form an image of each page. The image data of each page formed at the image forming unit 12 is temporarily stored in an image memorizing unit 14. An image outputting unit 18 which is, for example, a printer engine includes two processes of monochrome process 20 and color process 22. The monochrome process 20 is for printing a monochrome image while the color process 22 is for printing a color image.

A selecting unit 16 is to select whether the image data stored in the image memorizing unit 14 is processed with the monochrome process or color process. Its selection is executed for every predetermined unit which corresponds to, for example, one job or one page. As will be described later, in this embodiment, the monochrome process 20 is selected when all pixels constructing the processing unit are monochrome pixels while the color process 22 is selected when at least one color pixel is included in the predetermined unit.

A user interface (UI) 24 is connected to the selecting unit 16. This UI 24 is constructed in this embodiment with an inputting unit 26 and displaying unit 28. The inputting unit 26 is made by a pointing device such as a touch panel while the displaying unit 28 is made by a liquid display device. A user can input various conditions or instructions by using this inputting unit 26. Further, the judging result or selecting result of the monochrome/color at the selecting unit 16 is displayed on the displaying unit 28 as the need arises. As will be described later, the user can set the strictness of the judgement or select the judging method by using the inputting unit 26. The units 10 to 16 shown in FIG. 1 can be constructed with a software.

Subsequently, an operation of the image processing apparatus shown in FIG. 1 will be explained with reference to FIG. 2.

The image data is inputted at S101. One pixel (target pixel) that constructs the image data is extracted at S102, whereby a reference value K is calculated in accordance with plural color component values possessed by this pixel. The reference value K here is, for example, an average value of plural color component values or an weighed average value of plural color component values as will be described later. This reference value K can be various values as long as the center of the judging range can be determined.

At S103, a dispersed value $\alpha$ is obtained for defining the judging range having a constant width with the reference value as a center. The value $\alpha$ is fixedly set or variably set based upon the plural color component values possessed by the target pixel that is obtained at S102. Although explained in detail hereinafter, the dispersed value $\alpha$ may be determined by a calculation formula such as $\alpha = c1/K^n + c2$. The values c1 and c2 here are predetermined coefficients.

It is judged at S104 whether each color component value of the target pixel meets the judging condition that is set dynamically. For example, it is judged whether each color component value belongs to the judging range defined by the reference value K and dispersed value $\alpha$ as will be described later. If the judging condition is satisfied, the target pixel is judged to be a monochrome pixel at S105. On the other hand, the target pixel is judged to be a color pixel at S106 if the judging condition is not satisfied.

If at least one color pixel is judged to be included in the predetermined unit, the process moves from S107 to S110 where the color process is selected. The process selection with respect to the predetermined unit is completed, and the same process is repeatedly executed with respect to the next predetermined unit.

On the other hand, if the target pixel is judged to be a monochrome pixel, the process moves from S107 to S108 where it is checked whether the judgement is completed or not with respect to all pixels constructing the predetermined unit. If not completed, each process from S102 is executed with the target pixel sequentially switched. When the judgement with respect to all pixels is determined to be completed at S108, that is, when all pixels constructing the predetermined unit are judged to be monochrome pixels, the monochrome process is selected at S109. Then, the same process is repeatedly performed with respect to the next predetermined unit.

According to the aforesaid processing, the reference value K is variably set in accordance with the plural color component values possessed by the target pixel, and then, the judging condition can be determined with its reference value K as a center, whereby it is possible to determine a suitable judging condition in accordance with the characteristic of the pixel. Therefore, this process has an advantage that the image processing which matches man's visual characteristics can be implemented.

Figure 2:
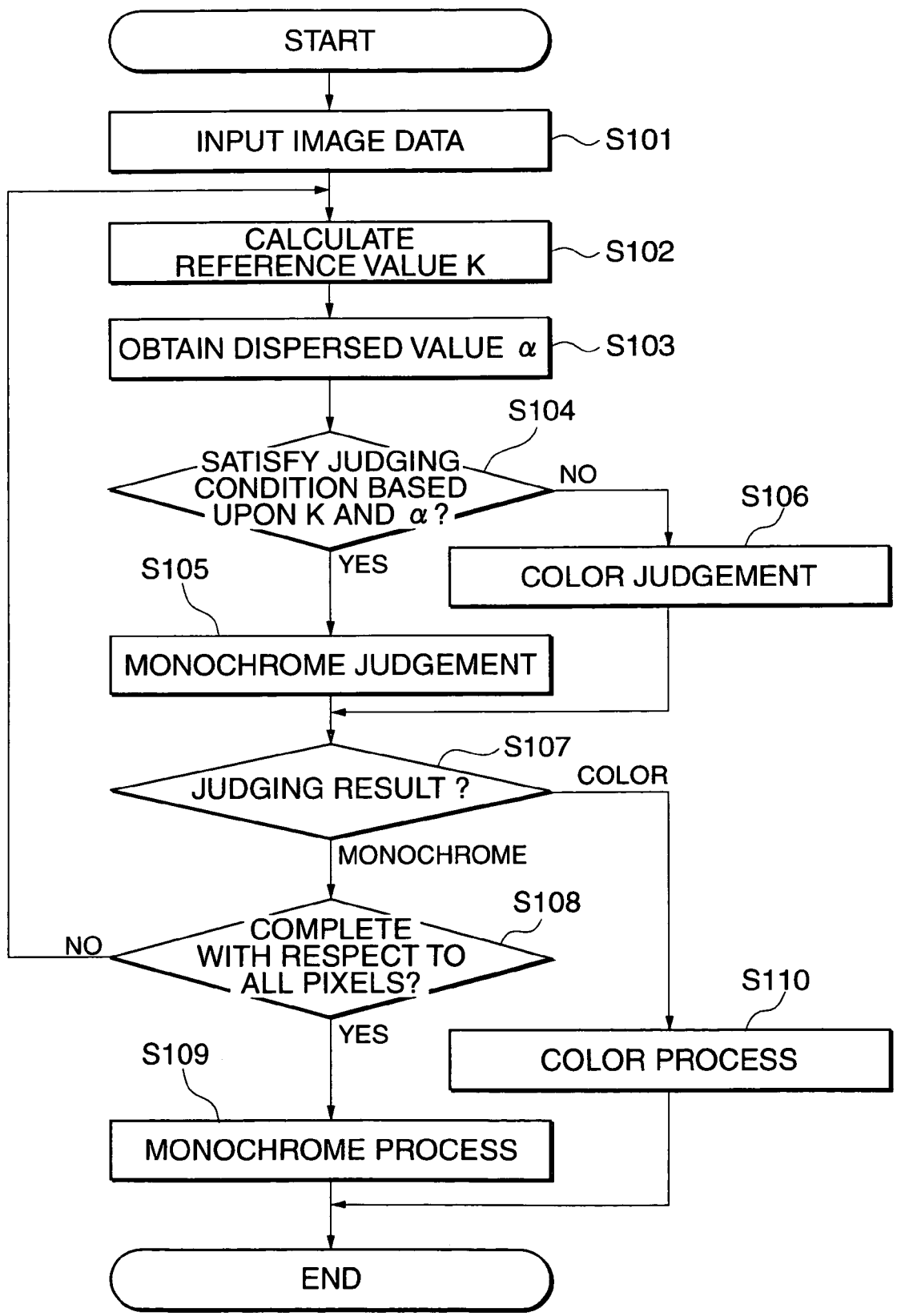
FIG. 2 is a flowchart showing a basic operation of the image processing apparatus.
Figure 3:
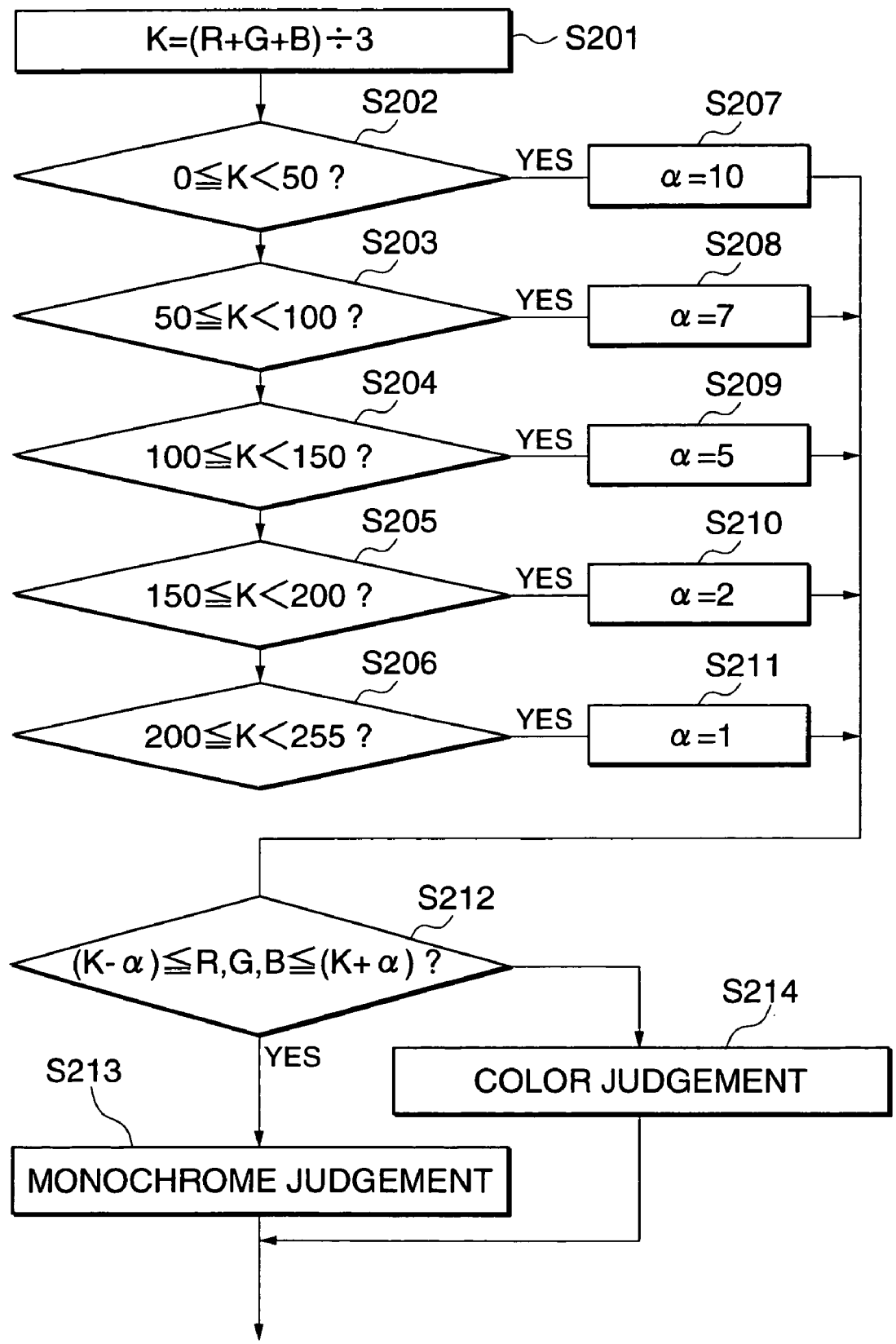
FIG. 3 is a view showing a first example of a monochrome/color judgement.
Figure 4:
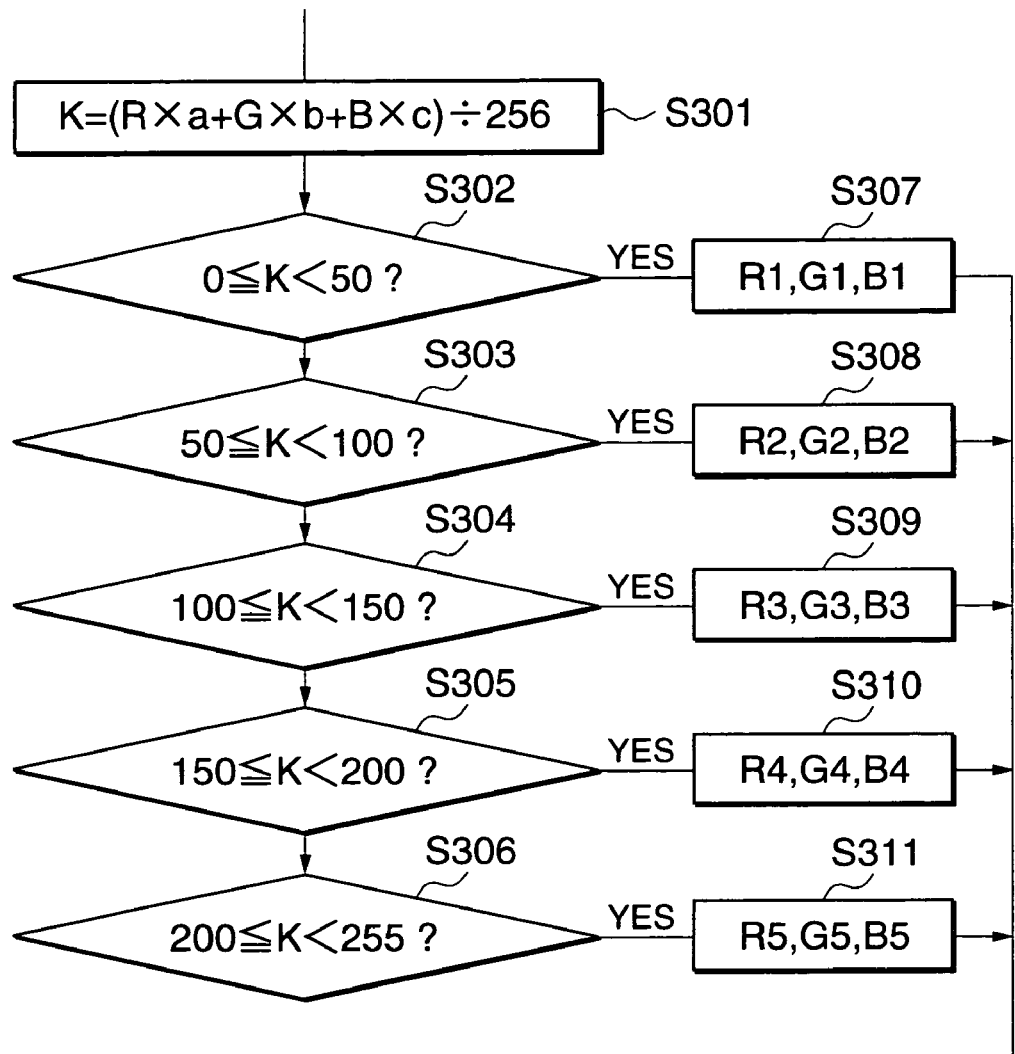
FIG. 4 is a view showing a second example of a monochrome/color judgement.
Figure 4:
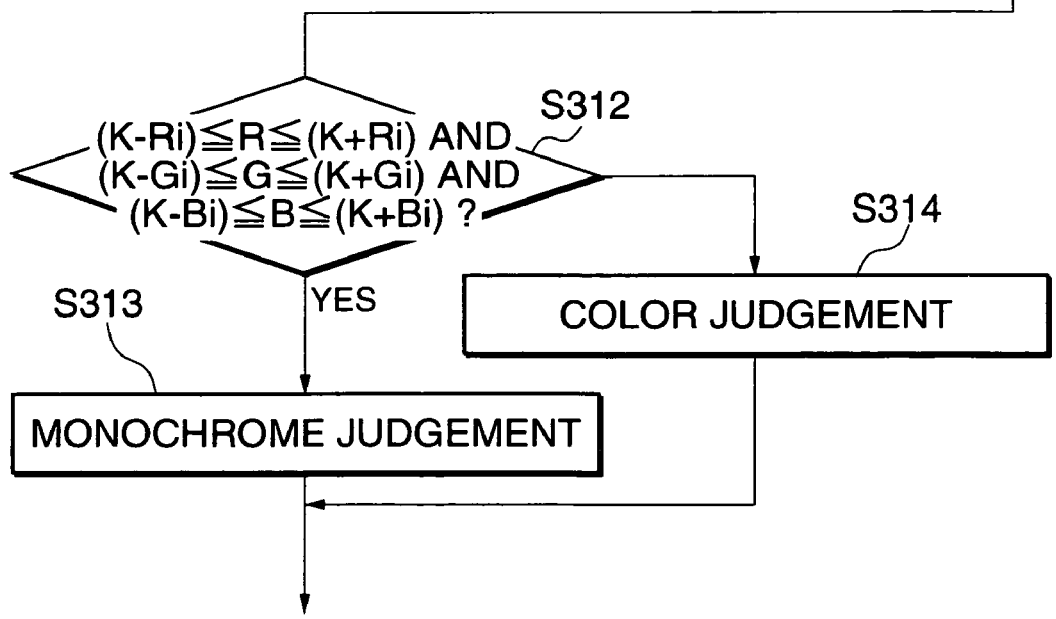

FIG. 3 and FIG. 4 show a specific example of each process from S102 to S106 shown in FIG. 2.

In FIG. 3, the reference value K is calculated with respect to the target pixel at S201. In the example shown in FIG. 3, the reference value K is calculated by performing a calculation of K=(R+G+B)÷3. Specifically, the reference value K is defined as an average value of the plural color component values.

A size of the reference value K is stepwisely judged at S202 to S206. Then, the dispersed value α is set at S207 to S211 for every step. In this example, the numerals 10, 7, 5, 2 and 1 are respectively set as the dispersed value α. Specifically, the greater the reference value K is, the smaller the dispersed value α is set, while the smaller the reference value K is, the greater the dispersed value α is set. Such a setting method can implement the judging operation that matches man's visual characteristics more closely.

It is judged at S212 whether or not each color component value of the target pixel stays within the range above or below a having the reference value K as a center. Specifically, it is judged whether or not each value of R, G and B is present within the range of K±α. If all the color component values meet its condition, the target pixel is judged to be a monochrome pixel at S213 while the target pixel is judged to be a color pixel if its condition is not satisfied.

Although a color attribute of the target pixel is constructed with three color component values of R, G and B in the aforesaid embodiment, the abovementioned technique is adaptable to the case where its color attribute is constructed with C, M and Y or C, M, Y and K. Further, the present invention can extendedly be adapted to the case where the color attribute is determined with CIE.

FIG. 4 shows a modified example of the processing shown in FIG. 3. The weighed average value of plural color component values is calculated as the reference value K at S301. Specifically, the calculation of K=(R×a+G×b+B×c)÷256 is executed. The mark a, b and c respectively are weighed values, that is, a=77, b=151 and c=28, for example.

According to such a setting of the weight coefficient, the setting of the reference value K more suitable to man's visual characteristics can be performed.

The processes S302 to S306 are the judging processes for variably setting the dispersed value α in response to the size of the reference value K like the processes S202 to S206 shown in FIG. 3. At S307 to S311, the dispersed values Ri, Gi and Bi are set for each color component value in response to the size of the reference value K. Specifically, it is possible to minutely set the judging condition for each color component value.

It is judged at S312 whether each color component value meets the judging condition corresponding to each color component value. Specifically, it is judged whether or not the conditions of (K−Ri)≦R≦(K+Ri) and (K−Gi)≦G≦(K+Gi) and (K−Bi)≦B≦(K+Bi) are satisfied. If this condition is satisfied, the target pixel is judged to be a monochrome pixel at S313 while the target pixel is judged to be a color pixel at S314 if this condition is not satisfied.

Figure 5:
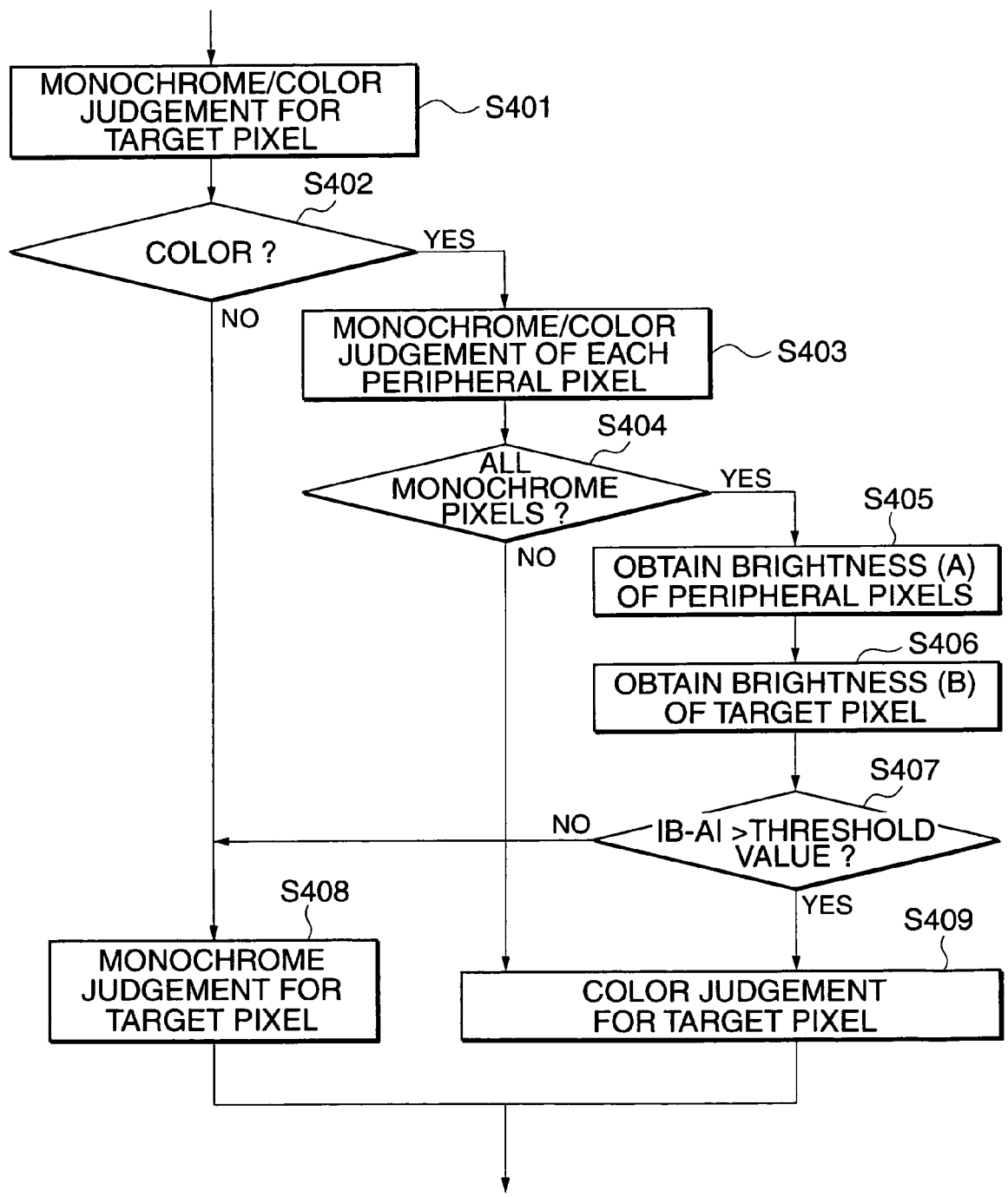
FIG. 5 is a view showing a third example of a monochrome/color judgement.

FIG. 5 shows a modified example in which the judging method shown in FIG. 2 is extended. Each of processes S401 to S409 is executed for every target pixel.

At S401, the same processes as those of S102 to S106 shown in FIG. 2 are executed with respect to the target pixel, whereby the monochrome/color judgement is performed with respect to the target pixel. If the judging result at S401 is monochrome at S402, the target pixel is finally judged to be a monochrome at S408.

On the other hand, if the target pixel is judged to be a color pixel at S401, the process moves from S402 to S403 where eight peripheral pixels (neighboring pixels) of the target pixel are referred to at S403, with the result that the monochrome/color judgement is executed for each peripheral pixel. Its judging technique is the same as that at S401.

If, at S404, one of eight peripheral pixels is the color pixel, the target pixel is finally judged to be a color pixel at S409. On the other hand, if, at S404, all the peripheral pixels are judged to be monochrome pixels, a brightness A of eight peripheral pixels is obtained at S405. For example, the brightness A is calculated by calculating the average value of each color component value of eight peripheral pixels.

A brightness B is obtained at S406 with respect to the target pixel. In this case, for example, the brightness B is obtained by obtaining the average value of each color component value of the target pixel.

The value |B−A| is calculated at S407 for judging whether its absolute value exceeds the threshold value or not. If the condition at S407 is not satisfied, i.e., if there is hardly a difference in the brightness between the target pixel and the peripheral pixel, the target pixel is finally judged to be a monochrome pixel at S408. On the other hand, if the condition at S407 is not satisfied, i.e., if there are great differences in the brightness between the target pixel and the peripheral pixels, the target pixel is finally judged to be a color pixel at S409.

FIG. 6 shows an example of the judgement by the technique shown in FIG. 5. FIG. 6A and FIG. 6B are the cases where the peripheral pixel is R=0, G=0 and B=0 while FIG. 6C and FIG. 6D are the cases where the peripheral pixel is R=G=B=255. Further, FIG. 6A and FIG. 6C are the cases where the target pixel is R=100 and G=B=0 while FIG. 6B and FIG. 6D are the cases where the target pixel is R=G=255 and B=100.

Figure 6A:
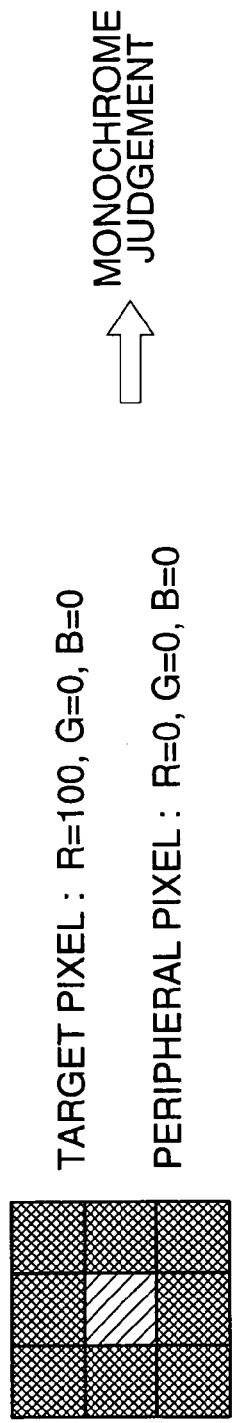
FIGS. 6A to 6D are explanatory views for explaining the effect of the judging method shown in FIG. 5.

Specifically, the example shown in FIG. 6A is the case where the background is black and the target pixel is red. In this case, the color judgement is executed with respect to the target pixel at S401. However, the brightness of the peripheral pixel is 0 with respect to the brightness 30 of the target pixel at S407 via the processes S403 to S406, to thereby obtain a difference of 30. If the threshold value is 35 here, the target pixel is judged to be a monochrome pixel.

Figure 6B:
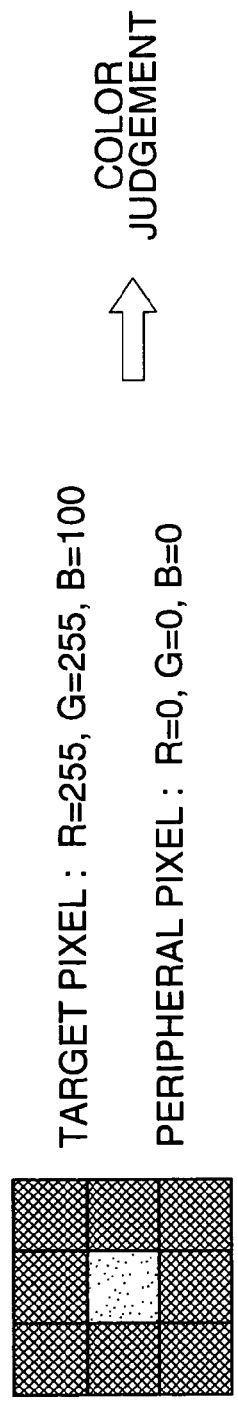

FIG. 6B is the case where the background is black and the target pixel is yellow. In this case, the brightness of the target pixel is 244 and the brightness of the peripheral pixel is 0, whereby the target pixel is judged to be a color pixel.

Figure 6C:
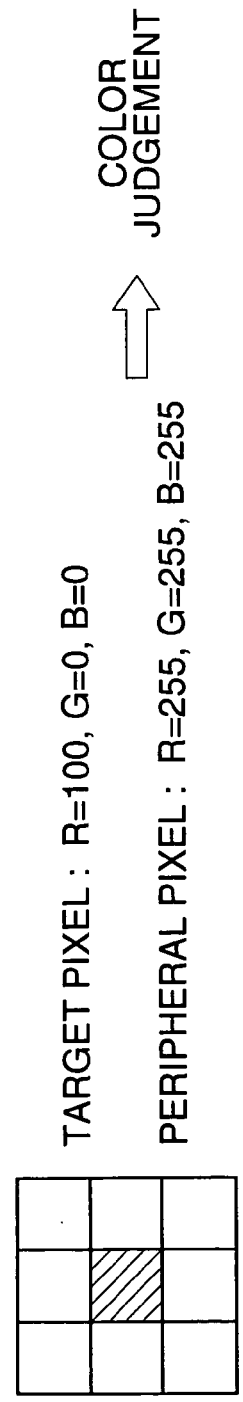

FIG. 6C is the case where the background is white and the target pixel is red. In this case, the difference in the brightness is great, so that the target pixel is judged to be a color pixel.

Figure 6D:
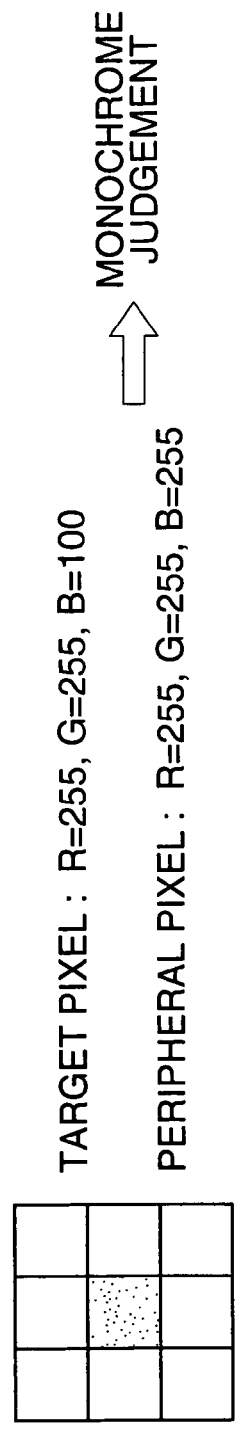

On the other hand, in FIG. 6D where the background is white and the target pixel is yellow, the difference in the brightness between the target pixel and the peripheral pixel is small. Therefore, the target pixel is judged to be a monochrome pixel.

As described above, more natural judgement is made possible according to the technique shown in FIG. 5 compared to the case of performing the monochrome/color judgement depending upon the target pixel itself. Specifically, it is possible to implement the comprehensive monochrome/color judgement considering the peripheral pixel upon judging the target pixel. Accordingly, the technique shown in FIG. 5 has an advantage that the image processing which perfectly matches the man's visual characteristics can be realized. It is desirable that the threshold value at S407 shown in FIG. 5 is formed so as to be variably set by the user.

Subsequently, an example of UI24 shown in FIG. 1 will be explained by using FIG. 7 to FIG. 10. A display image is illustrated in each figure.

Figure 7:
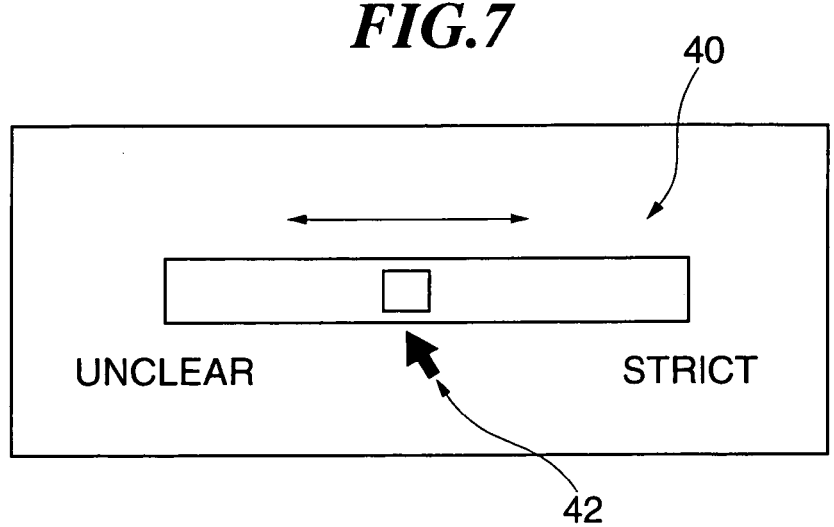
FIG. 7 is a view for showing a screen display example for performing a change in condition by a user.
Figure 8:
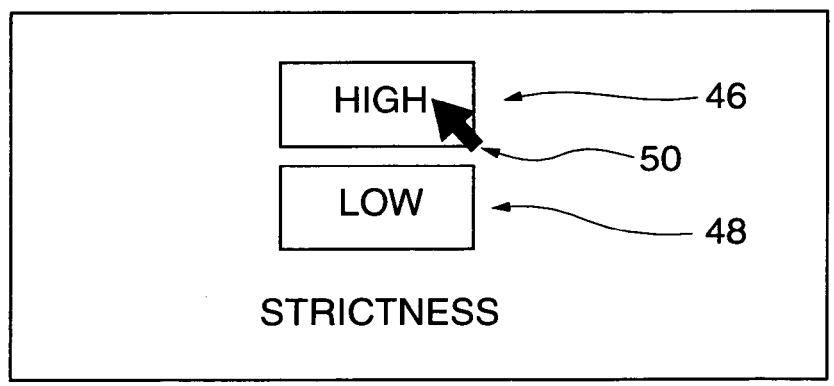
FIG. 8 is a view for showing a screen display example for performing a change in condition by a user.

In the example shown in FIG. 7, a sliding bar 40 is displayed on the screen. The position of a mark on the sliding bar is caused to be shifted by using a cursor 42, whereby the strictness can be variably adjusted. The strictness here becomes, for example, a parameter for defining the size of the dispersion value α. This strictness may be used for determining the reference value K. In the example shown in FIG. 8, two buttons 46 and 48 are displayed in the screen. The user can optionally select the high strictness or low strictness by clicking either one of buttons with a cursor 50.

Figure 9:
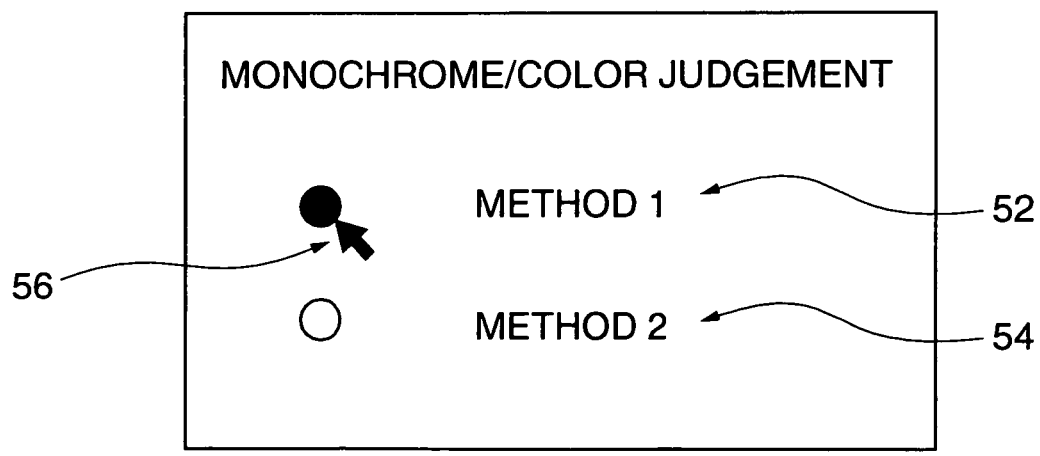
FIG. 9 is a view for showing a screen display example for performing a change in condition by a user.

In the example shown in FIG. 9, two items 52 and 54 are displayed on the screen. The monochrome/color judging method can optionally be selected by selecting either one of the items by utilizing a cursor 56. For example, it is possible to select either one of the judging methods shown in FIG. 3 and FIG. 4, and further, it is possible to select the method shown in FIG. 5 as the need arises.

Figure 10:
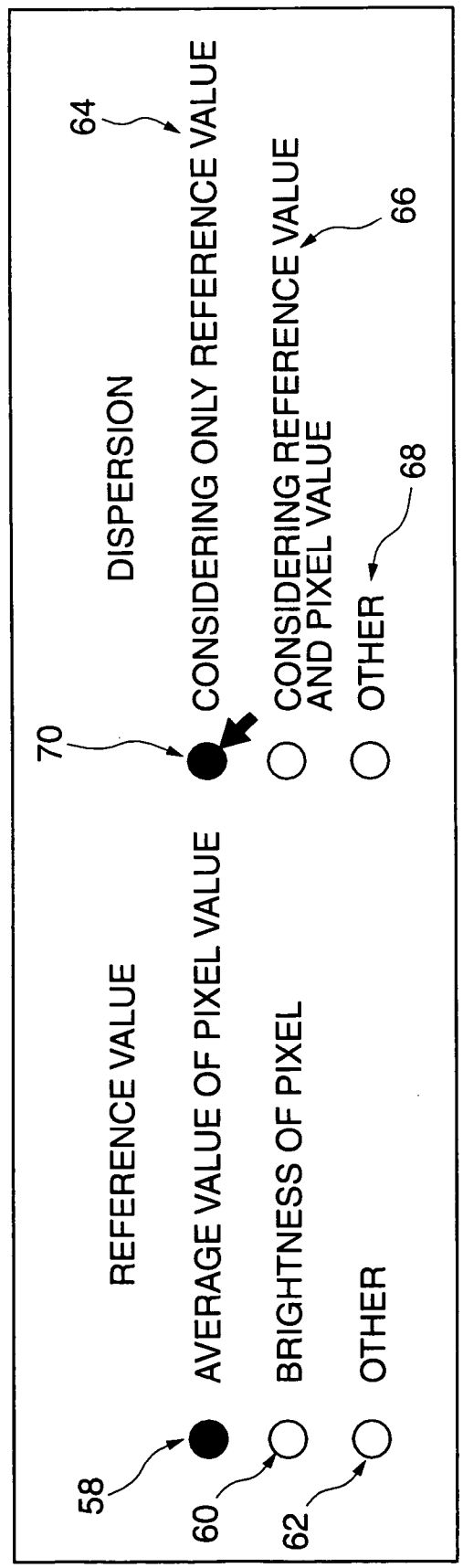
FIG. 10 is a view for showing a screen display example for performing a change in condition by a user.

In the example shown in FIG. 10, the determining method with respect to both of the reference value and the dispersed value can be selected by the user. Specifically, any one item can be selected among three items 58 to 62 with respect to the reference value, i.e., it is possible to select the case where the average value of the pixel value is utilized as the reference value, the case where the brightness of the pixel is utilized or another case. Similarly, three items 64 to 68 are prepared with respect to the dispersed value, whereby it is possible to optionally select by the user the case where only the reference value is considered, the case where the reference value and the pixel value are considered or the other case.

Figure 11:
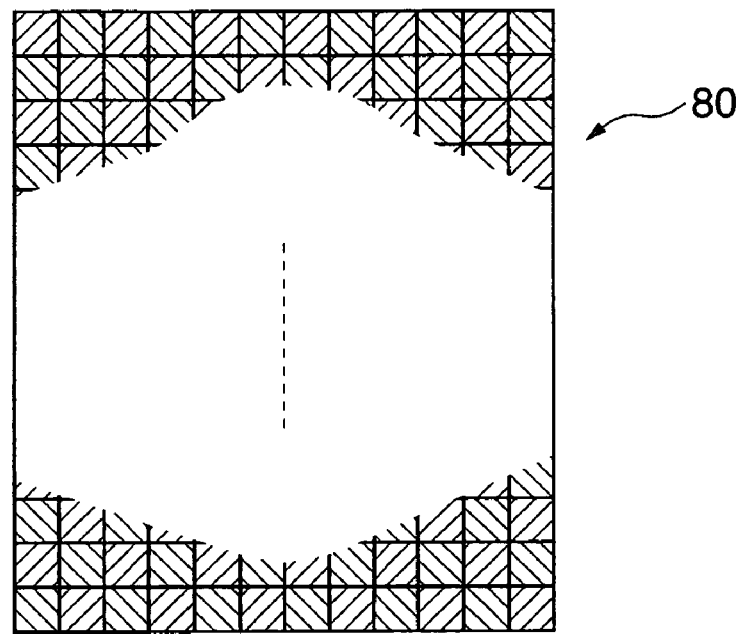
FIG. 11 is a view showing the case where all pixels become a judging object in the image.

In the aforesaid embodiment, the monochrome/color judgement is performed for every each pixel with respect to all pixels constructing the image 80 shown as a hatched pixel group in FIG. 11. On the other hand, the monochrome/color judgement may be performed with respect to one portion of an image. For example, the monochrome/color judgement may be executed for every other pixel line shown in FIG. 12, or may be performed every other pixel shown in FIG. 13.

Further, in view of the judging unit (target pixel), the monochrome/color judgement may be performed with a pixel line unit or a block area unit (that is, with a predetermined pixel group unit), not with a pixel unit. For example, every other pixel line is defined as the judging unit respectively in FIG. 12.

Figure 12:
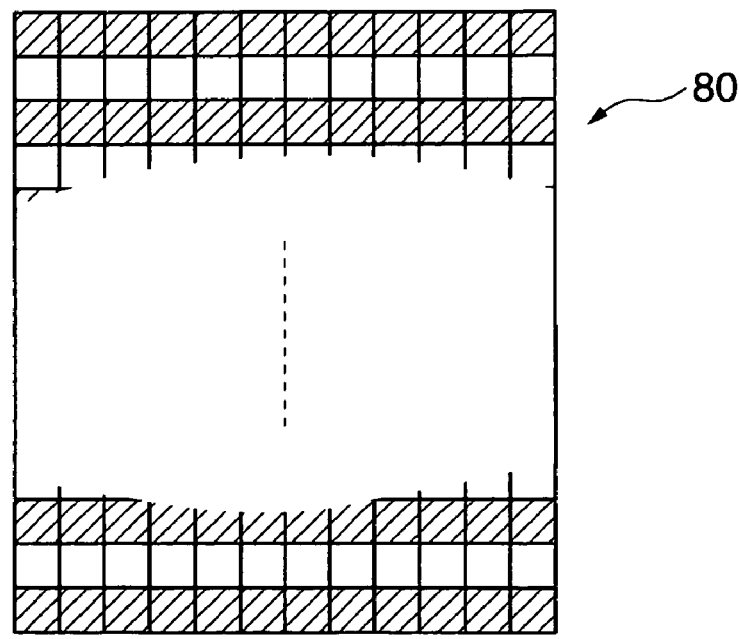
FIG. 12 is a view showing the case where every other line becomes a judging object in the image.
Figure 13:
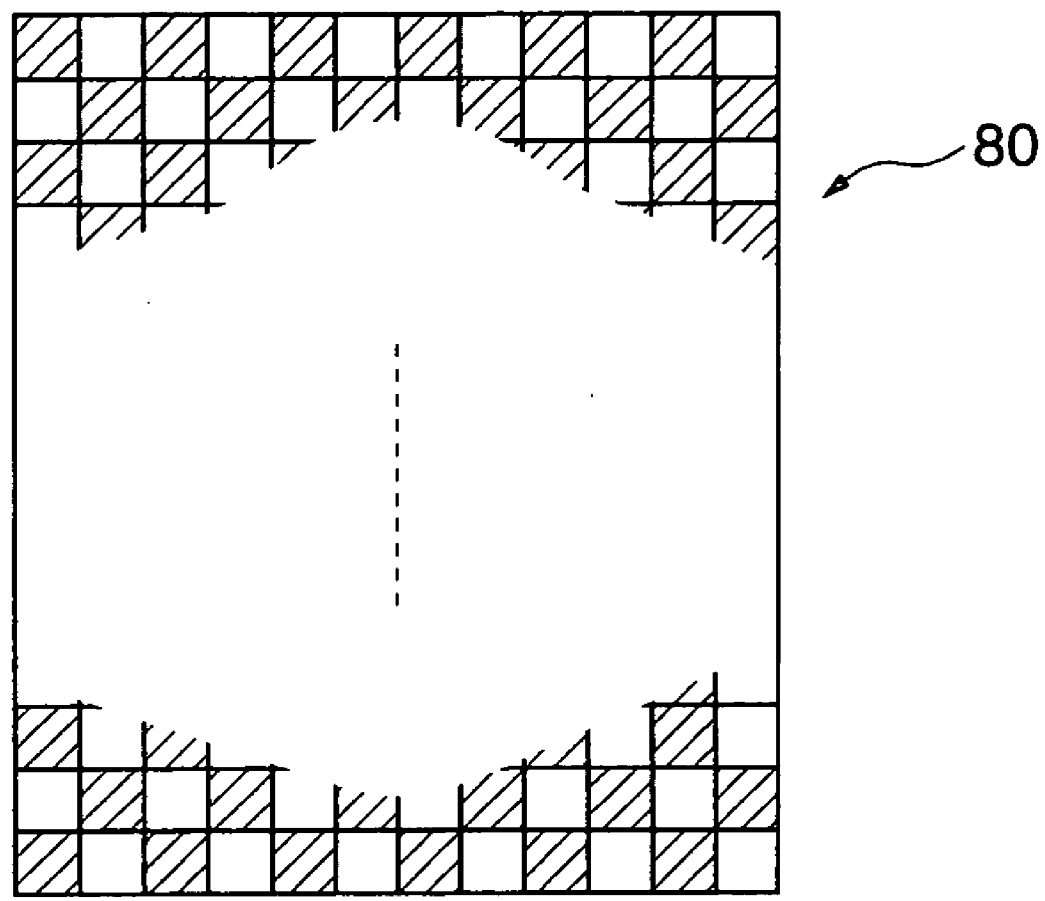
FIG. 13 is a view showing the case where every other pixel becomes a judging object in the image.
Figure 14:
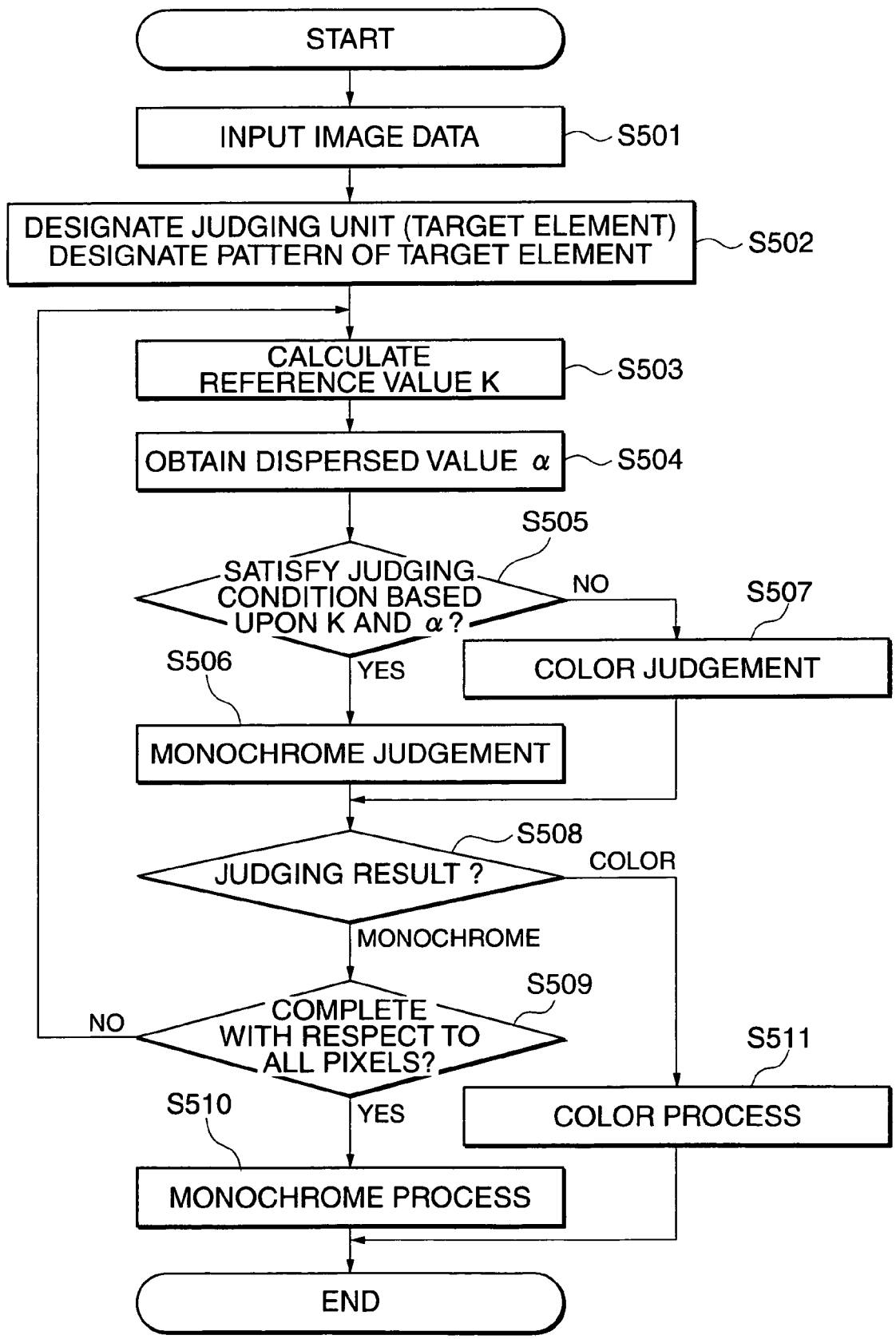
FIG. 14 is a view showing a modified example of the monochrome/color judgement.

FIG. 14 shows an operation as a flowchart for implementing a modified example shown in FIG. 12 and FIG. 13. This flowchart corresponds to a developed form of the flowchart shown in FIG. 12.

Firstly, image data is inputted at S501. Then, the judging unit (target element) and its pattern are designated by the user or the like at S502. Although a pixel is normally designated here as the judging unit, a pixel line or pixel block may be designated. The designation of the pattern is performed if the entire area of the image does not become the judging object. For example, the pattern condition shown in FIGS. 12 and 13 is selected.

At S503, one target element is extracted among all the target elements included in the image data, whereby the reference value K is calculated according to the plural color component values possessed by the target element. If the target element is constructed with one pixel, its reference value K is, for example, the average value of the plural color component value possessed by its pixel (refer to FIG. 3), or the weight average value of the plural color component value (refer to FIG. 4). If the target element is constructed with plural pixels, the reference value K may be, for example, a total average value of the plural color component values possessed by these pixels. In either case, the reference value K can take various values as long as the center of the judging range can be determined.

The dispersed value α is obtained at S504 for defining the judging range having a constant width with the reference value as its center. The dispersed value α is fixedly set or variably set based upon the plural color component values possessed by the target element (refer to the explanation about S103 in FIG. 2).

It is judged at S505 whether or not the color attribute of the target element satisfies the judging condition determined based upon the reference value K and dispersed value α. For example, it is judged whether or not each color component value stays within the judging range defined by the reference value K and the dispersed value α as described above. In this case, if the target element is constructed with plural pixels, the judgement at S505 may individually be performed with respect to the individual color component value, or the judgement at S505 may be performed with respect to the color component value possessed by one or plural representative pixels in the target element.

If the judging condition is satisfied, the target element is judged to be monochrome at S506, while the target element is judged to be colored at S507 if the judging condition is not satisfied.

When the color judgement is executed one time during the predetermined unit (page or job), the process moves from S508 to S511 where the color process is selected. Then, the selection of the process with respect to the predetermined unit that the processing is now going on is terminated, and then, the same process is repeatedly executed with respect to the next predetermined unit.

On the other hand, when the target element is judged to be monochrome, the process moves from S508 to S509 where it is checked whether or not the judgement is completed with respect to all target elements in the predetermined unit. If not completed, each process from S503 is executed as the target element is sequentially changed.

When the judgement for all the target elements is judged to be completed at S509, i.e., all the target elements are judged to be monochrome, the monochrome process is selected at S510. Then, the same process is repeatedly performed for the next predetermined unit.

According to the abovementioned process, the processing time can have priority or the detecting precision of an image can have priority.

As described above, the present invention can implement a reasonable monochrome/color judgement, in particular, the present invention has an advantage that the judgement can be executed with man's visual characteristics taken into consideration.

What is claimed is:

1. An image processing apparatus comprising:
   a reference value determining part that determines a reference value with respect to a target element in an image based upon a color attribute of the target element wherein,
   a plurality of independent parameters determine the reference value such that at least one of the plurality of independent parameters includes a plurality of predetermined ranges and another one of the plurality of independent parameters includes a plurality of dispersion values assigned to each predetermined range;
   a judging condition setting part that sets a judging condition based upon the reference value and the corresponding dispersion value; and
   a monochrome/color judging part that judges that the target element is monochrome if the color attribute of the target element meets the judging condition and that the target element is colored if the color attribute of the target element does not meet the judging condition.

2. An image processing apparatus according to claim 1, further comprising:
   a selecting part that selects monochrome image processing or color image processing for every predetermined unit according to the judging result of the monochrome/color judging part.

3. An image processing apparatus according to claim 2, wherein the selecting part selects the monochrome image processing when all the target elements included in the predetermined unit are judged to be monochrome and selects the color image processing when any one of the target elements included in the predetermined unit is judged to be colored.

4. An image processing apparatus according to claim 3, wherein the predetermined unit corresponds to a page unit or job unit.

5. An image processing apparatus according to claim 1, wherein all pixels in the image are rendered to be the target elements, respectively.

6. An image processing apparatus according to claim 1, wherein part of pixels in the image are rendered to be the target elements, respectively.

7. An image processing apparatus according to claim 1, wherein all pixel groups in the image are rendered to be the target elements, respectively.

8. An image processing apparatus according to claim 1, wherein part of pixel groups in the image are rendered to be the target elements, respectively.

9. The image processing apparatus according to claim 1, wherein the plurality of dispersion value are determined corresponding to a plurality of predetermined stepwise ranges of the reference value.

10. An image processing apparatus comprising:
    a reference value determining part that determines a reference value with respect to a target element in an image based upon plural color component values possessed by the target element, wherein
    a plurality of independent parameters determine the reference value such that at least one of the plurality of independent parameters includes a plurality of predetermined ranges and another one of the plurality of independent parameters includes a plurality of dispersion values assigned to each predetermined range;
    a judging range setting part that sets a judging range based upon the reference value and the corresponding dispersion value; and
    a monochrome/color judging part that judges that the target element is monochrome if the plural color component values possessed by the target element are present within the judging range and that the target element is colored if any one of the plural color component values possessed by the target element is outside the judging range.

11. An image processing apparatus according to claim 10, wherein the reference value is an average value of the plural color component values possessed by the target element.

12. An image processing apparatus according to claim 10, wherein the reference value is a weighed average value of the plural color component values possessed by the target element.

13. An image processing apparatus according to claim 10, wherein the width of the judging range is variably set in response to the reference value.

14. An image processing apparatus according to claim 13, wherein, when the greater the reference value is, the smaller the width of the judging range is set while the smaller the reference value is, the greater the width of the judging range is set.

15. An image processing apparatus according to claim 10, wherein the judging range is individually set for every color component, and the monochrome/color judgement is executed for every color component.

16. An image processing apparatus according to claim 10, further comprising:
    a part that enables a user to variably set at least one of a determining condition of the reference value and a setting condition of the judging range.

17. The image processing apparatus according to claim 10, wherein the plurality of dispersion value are determined corresponding to a plurality of predetermined stepwise ranges of the reference value.

18. An image processing apparatus comprising:
    a first judging part that judges whether a target element in an image is monochrome or not;
    a second judging part that judges whether plural neighboring elements in the vicinity of the target element are monochrome or not when the first judging part judges that the target element is not monochrome; and
    a third judging part that judges whether the target element is monochrome or color from a comparison of brightness of the target element with brightness of the plural neighboring elements when all the neighboring elements are judged to be monochrome by the second judging part,
    wherein the target element is finally judged to be monochrome if the first judging part judges that the target element is monochrome and the third judging part judges that the target element is monochrome, and the target element is finally judged to be colored if the second judging part judged that not all the neighboring elements are monochrome and if the third judging part judges that the target element is colored.

19. An image processing apparatus according to claim 18, wherein the first judging part comprises:
   a first reference value determining part that determines a first reference value based upon a color attribute of the target element;
   a first judging condition setting part that sets a first judging condition based upon the first reference value; and
   a first monochrome/color judging part that judges that the target element is monochrome when the color attribute of the target element meets the first judging condition and judges that the target element is colored when the color attribute of the target element does not meet the first judging condition, and
   the second judging part comprises:
   a second reference value determining part that determines a second reference value based upon a color attribute of the neighboring element;
   a second judging condition setting part that sets a second judging condition based upon the second reference value; and
   a second monochrome/color judging part that judges that the target element is monochrome when the color attribute of the target element meets the second judging condition and judges that the target element is colored when the color attribute of the target element does not meet the second judging condition.

20. An image processing apparatus comprising:
   a monochrome/color judging part that judges whether image data is color data or monochrome data based upon a predetermined judging criterion; and
   a judging criterion variable setting part adapted to set a plurality of independent predetermined judging criterion variables in the monochrome/color judging part, wherein the plurality of independent predetermined judging criterion variables include a plurality of predetermined ranges and a plurality of dispersion values assigned for each predetermined range.

21. An image processing apparatus according to claim 20, wherein the judging criterion variably setting part adaptively sets the predetermined judging criterion based upon the image data itself.

22. An image processing method comprising the step of:
   determining a reference value with respect to a target element in an image based upon a color attribute of the target element, wherein
   a plurality of independent parameters determine the reference value such that at least one of the plurality of independent parameters includes a plurality of predetermined ranges and another one of the plurality of independent parameters includes a plurality of dispersion values assigned to each predetermined range;
   setting a judging condition based upon the reference value and the corresponding dispersion value; and
   judging whether the target element is monochrome or colored from the color attribute of the target element based upon the judging condition.

23. A recording medium readable by a computer, the medium storing an image processing program that causes the computer to execute instructions comprising the functions for:
   determining a reference value with respect to a target element in an image based upon a color attribute of the target element, wherein
   a plurality of independent parameters determine the reference value such that at least one of the plurality of independent parameters includes a plurality of predetermined ranges and another one of the plurality of independent parameters includes a plurality of dispersion values assigned to each predetermined range;
   setting a judging condition based upon the reference value and the corresponding dispersion value; and
   judging whether the target element is monochrome if the color attribute of the target element meets the judging condition and that the target element is colored if the color attribute of the target element does not meet the judging condition.

* * * * *